US007099328B2

(12) United States Patent
Galbi et al.

(10) Patent No.: US 7,099,328 B2
(45) Date of Patent: Aug. 29, 2006

(54) METHOD FOR AUTOMATIC RESOURCE RESERVATION AND COMMUNICATION THAT FACILITATES USING MULTIPLE PROCESSING EVENTS FOR A SINGLE PROCESSING TASK

(75) Inventors: Duane E. Galbi, Cambridge, MA (US); Joseph B. Tompkins, Framingham, MA (US); Bruce G. Burns, Westford, MA (US); Daniel J. Lussier, Holliston, MA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 401 days.

(21) Appl. No.: 09/919,283

(22) Filed: Jul. 31, 2001

(65) Prior Publication Data

Related U.S. Application Data

(63) Continuation of application No. 09/640,258, filed on Aug. 16, 2000, now Pat. No. 6,754,223, which is a continuation of application No. 09/640,231, filed on Aug. 16, 2000, now Pat. No. 6,804,239, and a continuation of application No. 09/639,915, filed on Aug. 16, 2000, now Pat. No. 6,888,830.

(60) Provisional application No. 60/221,821, filed on Jul. 31, 2000, provisional application No. 60/149,376, filed on Aug. 17, 1999.

(51) Int. Cl.
*H04L 12/56* (2006.01)
*G06F 12/00* (2006.01)

(52) U.S. Cl. .............................. 370/395.1; 370/395.4; 370/412

(58) Field of Classification Search ............. 370/395.1, 370/395.41, 395.42, 395.4, 412, 419, 432
See application file for complete search history.

(56) References Cited

U.S. PATENT DOCUMENTS

| 5,805,927 | A | | 9/1998 | Bowes et al. |
| 5,896,511 | A | * | 4/1999 | Manning et al. ............. 709/232 |
| 5,920,561 | A | | 7/1999 | Daniel et al. |
| 6,021,132 | A | * | 2/2000 | Muller et al. ................ 370/412 |
| 6,157,955 | A | * | 12/2000 | Narad et al. ................. 709/228 |
| 6,246,682 | B1 | * | 6/2001 | Roy et al. .................... 370/390 |
| 6,310,879 | B1 | * | 10/2001 | Zhou et al. .................. 370/397 |
| 6,373,846 | B1 | * | 4/2002 | Daniel et al. ........... 370/395.65 |
| 6,625,689 | B1 | * | 9/2003 | Narad et al. ................. 711/110 |
| 6,667,978 | B1 | * | 12/2003 | Delp et al. ................ 370/395.1 |
| 6,724,767 | B1 | * | 4/2004 | Chong et al. ................ 370/412 |
| 6,782,465 | B1 | * | 8/2004 | Schmidt ...................... 711/208 |

OTHER PUBLICATIONS

Lee, T. Andy, et al., "Low Power Data Management Architecture for Wireless Communications Signal Processing," Stanford University, IEEE 1998, pp. 625-629.

* cited by examiner

*Primary Examiner*—Seema S. Rao
*Assistant Examiner*—Robert C. Scheibel, Jr.
(74) *Attorney, Agent, or Firm*—Keith Kind; Kelly H. Hale (57) ABSTRACT

An integrated circuit for processing communication packets having separate data buffers and separate state information buffers. Each data buffer and each state information buffer (hereinafter termed resources) has an associated in-use counter. Multiple events can share the same resource. The counter associated with a resource is incremented when a resource becomes associated with a particular event. The counter associated with a resource is decremented when an event completes the use of that particular resource. When the in-use counter for a resource becomes zero, the in-use counter indicates that the resource is unassigned and that the resource can be assigned to a new event.

8 Claims, 9 Drawing Sheets

METHOD FOR AUTOMATIC RESOURCE RESERVATION AND COMMUNICATION THAT FACILITATES USING MULTIPLE PROCESSING EVENTS FOR A SINGLE PROCESSING TASK

RELATED APPLICATIONS

1) The current non-provisional application claims priority from provisional application 60/221,821 entitled "Traffic Steam Processor" filed on Jul. 31, 2000.
2) The current application is a continuation of the non-provisional application Ser. No. 09/639,915 entitled "integrated Circuit that Processes Communication Packets with Scheduler Circuitry that Executes Scheduling Algorithms based on Cached Scheduling Parameters", now U.S. Pat. No. 6,888,830, filed on Aug. 16, 2000 which claims priority of the provisional application No. 60/149,376 filed on Aug. 17,1999 entitled "High speed communication processing device for internet protocol, asynchronous transfer mode, frame relay, and sonnet communications".
3) The current application is a continuation of the non-provisional application Ser. No. 09/640,258 entitled "Integrated Circuit that Processes Communication Packets with Co-Processor Circuitry to Determine a Prioritized Processing Order for a Core Processor" filed on Aug. 16, 2000, now U.S. Pat. No. 6,754,223, which claims priority of the provisional application No. 60/149,376 filed on Aug. 17, 1999 entitled "High speed communication processing device for internet protocol, asynchronous transfer mode, frame relay, and sonnet communications."
4) The current application is a continuation of the non-provisional application Ser. No. 09/640,231 entitled "Integrated Circuit that Processes Communication Packets with Co-Processor Circuitry to Correlate a Packet Stream with Context Information" filed on Aug. 16, 2000, now U.S. Pat. No. 6,804,239, which claims priority of the provisional application No. 60/149,376 filed on Aug. 17, 1999 entitled "High speed communication processing device for internet protocol, asynchronous transfer mode, frame relay, and sonnet communications."

The content of the above applications is hereby incorporated herein by reference.

FIELD OF THE INVENTION

The present invention is related to the field of communications, and more particularly to integrated circuits that process communication packets.

BACKGROUND OF THE INVENTION

Many communication systems transfer information in streams of packets. In general, each packet contains a header and a payload. The header contains control information, such as addressing or channel information, that indicate how the packet should be handled. The payload contains the information that is being transferred. Some examples of the types of packets used in communication systems include, Asynchronous Transfer Mode (ATM) cells, Internet Protocol (IP) packets, frame relay packets, Ethernet packets, or some other packet-like information block. As used herein, the term "packet" is intended to include packet segments.

Integrated circuits termed "traffic stream processors" have been designed to apply robust functionality to high-speed packet streams. Robust functionality is critical with today's diverse but converging communication systems. Stream processors must handle multiple protocols and inter-work between streams of different protocols. Stream processors must also ensure that quality-of service constraints, priority, and bandwidth requirements are met. This functionality must be applied differently to different streams, and there may be thousands of different streams.

Co-pending applications Ser. No. 09/639,966, now U.S. Pat. No. 6,760,337, Ser. No. 09/640,231, now U.S. Pat. No. 6,804,239, and Ser. No. 09/640,258, now U.S. Pat. No. 6,754,223 the content of which is incorporated herein by reference, describe an integrated circuit for processing communication packets. As described in the above applications, the integrated circuit includes a core processor. The processor handles a series of tasks, termed "events". These events consist of tasks such as CPU processing steps as well as the scheduling of subsequent events. These subsequently scheduled events may consist of CAM lookups, DMA data transfers, or other generic events based on conditions in the current event. All events have an associated service address, "context information" and "data". Information about the event such as the resource that requested the event, how much data is associated with the event, and other key information from the event requestor is stored in "special state" information associated with the event. When an external resource initiates an event, the external resource supplies the core processor with a memory pointer to "context" information and it also supplies the data to be associated with the event.

The context pointer is used to fetch the context from external memory and to store this "context" information in memory located on the chip. If the required context data has already been fetched onto the chip, the hardware recognizes this fact and sets the on chip context pointer to point to this already pre-fetched context data. Only a small number of the system "contexts" are cached on the chip at any one time, and their allocation needs to managed and sometimes shared among multiple processing events. Each cached "context" has an in-use counter so that one context can be associated with multiple sets of data. The rest of the system "contexts" are stored in external memory. This context fetch mechanism and the storage of these contexts in the co-processor is described in the above referenced co-pending applications.

In the circuit described in the above references co-pending applications, data and context information for a number of events are stored in buffers in a co-processor. In order to process an event, the core processor needs the service address of the event as well as the "context" and "data" associated with the event. The service address is the starting address for the instructions used to service the event. The core processor branches to the service address in order to start servicing the event.

SUMMARY OF THE INVENTION

The present invention adds flexibility and additional functions to an integrated circuit such as that described in the above references co-pending applications. In the integrated circuit shown in the referenced co-pending applications, special state information is effectively stored together with associated data in data buffers. Furthermore, the data buffers do not have associated in-use counters. With the present invention, separate logical buffers are provided for special state information and for the associated data buffer. Furthermore, each data buffer and each special state information buffer (hereinafter termed resources) has an associated in-use counter. Multiple events can share the same resource. The counter associated with a resource is incremented when a resource becomes associated with a particular event. The counter associated with a resource is decremented when an event completes the use of that particular resource. When the in-use count for a resource becomes zero, the in-use count indicates that the resource is unassigned and that the resource can be assigned to a new event.

With the present invention, two events can point to (i.e. utilize) the same data buffer and/or the same special state information buffer. Furthermore the content of a data buffer or a special state information buffer can be passed directly from one event to another event without reading the data into and out of memory. The in-use counter is particularly useful to facilitate the timing of DMA requests without need for explicit control by an external program. With the present invention two events can use the same data buffer. This is possible since the special state information is stored in a separate buffer. Furthermore, with the present invention one can have one data buffer associated with multiple context buffers since the special state information is stored separately from the associated data. The present invention also adds a communication mechanism which allows an event to pass a multi-bit message to subsequent events. This message passing mechanism does not require that the two events share any of the same context, data, or special state resources.

DETAILED DESCRIPTION OF THE INVENTION

Various aspects of packet processing integrated circuits are discussed in U.S. Pat. No. 5,748,630, entitled "ASYNCHRONOUS TRANSFER MODE CELL PROCESSING WITH LOAD MULTIPLE INSTRUCTION AND MEMORY WRITE-BACK", filed on May 9, 1996. The content of the above referenced patent is hereby incorporated by reference into this application in order to shorten and simplify the description in this application.

One embodiment of the present invention described herein is applied as an improvement to the type of integrated circuit described in co-pending U.S. patent applications Ser. No. 60/211,863 filed on Jun. 14, 2000, Ser. No. 09/640,260, now pending, filed on Aug. 16, 2000, Ser. No. 09/639,915 filed on Aug. 16, 2000, now U.S. Pat. No. 6,888,830, Ser. No. 09/639,966, now U.S. Pat. No. 6,760,337 filed on Aug. 16, 2000, Ser. No. 09/640,258, now U.S. Pat. No. 6,754,223, filed on Aug. 16, 2000 and Ser. No. 09/640,231, now U.S. Pat. No. 6,804,239, filed on Aug. 17, 2000, the content of which is hereby incorporated herein by reference in order to shorten and simplify the description of the present application.

Figure 1:
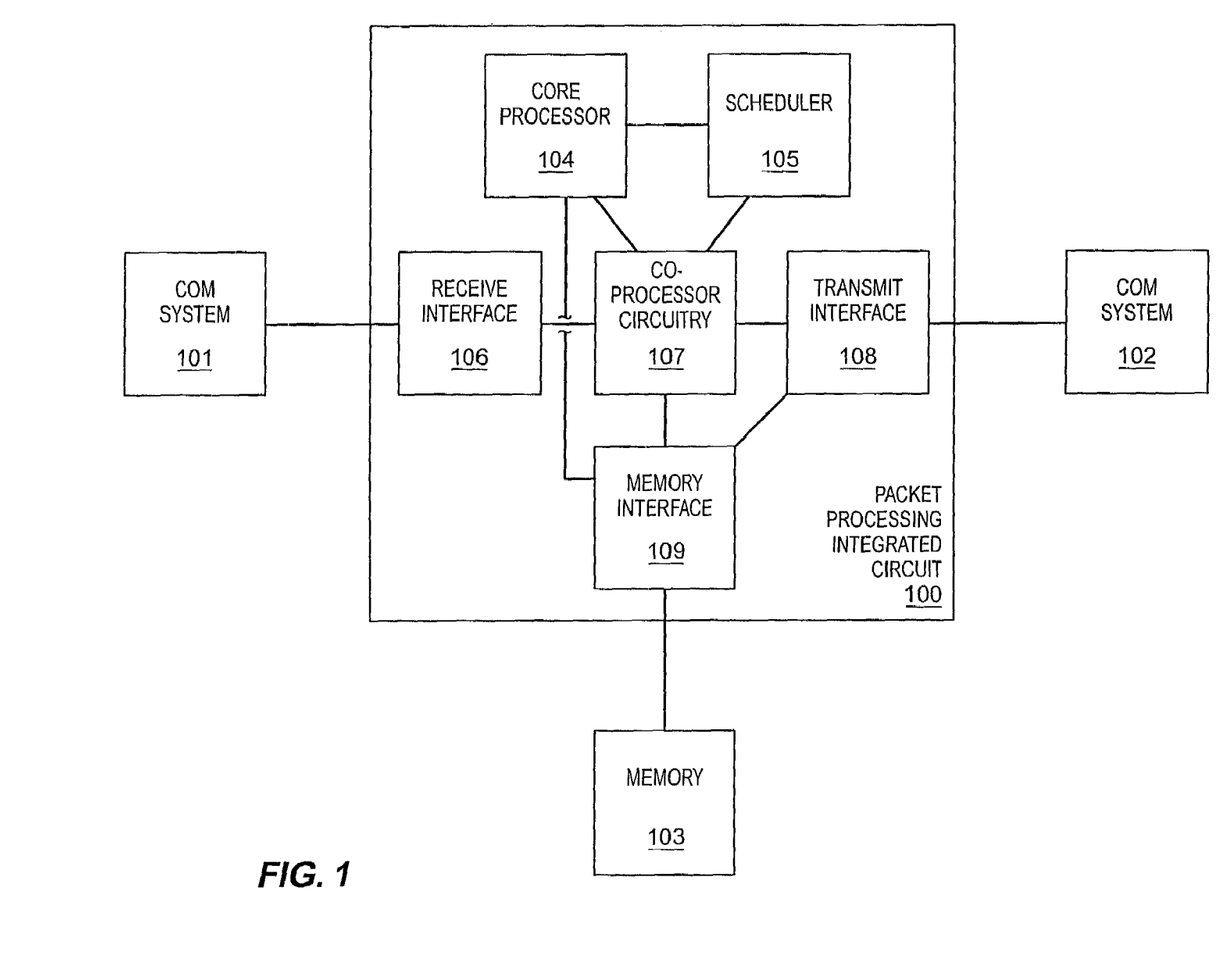
FIG. 1 is an overall block diagram of a packet processing integrated circuit in an example of the invention.

FIG. 1 is a block diagram that illustrates a packet processing integrated circuit 100 in an example of the invention. It should be understood that the present invention can also be applied to other types of processors. The operation of the circuit 100 will first be described with reference to FIGS. 1 to 4 and then the operation of different embodiments of the invention will be described with reference to FIGS. 5 to 9.

Integrated circuit 100 includes a core processor 104, a scheduler 105, receive interface 106, co-processor circuitry 107, transmit interface 108, and memory interface 109. These components may be interconnected through a memory crossbar or some other type of internal interface. Receive interface 106 is coupled to communication system 101. Transmit interface 108 is coupled to communication system 102. Memory interface is coupled to memory 103.

Communication system 101 could be any device that supplies communication packets with one example being the switching fabric in an Asynchronous Transfer Mode (ATM) switch. Communication system 101 could be any device that receives communication packets with one example being the physical line interface in the ATM switch. Memory 103 could be any memory device with one example being Random Access Memory (RAM) integrated circuits. Receive interface 106 could be any circuitry configured to receive packets with some examples including UTOPIA interfaces or Peripheral Component Interconnect (PCI) interfaces. Transmit interface 108 could be any circuitry configured to transfer packets with some examples including UTOPIA interfaces or PCI interfaces.

Core processor 104 is a micro-processor that executes networking application software. Core-processor 104 supports an instruction set that has been tuned for networking operations especially context switching. As described herein, core processor 104 has the following characteristics: 166 MHz, pipelined single-cycle operation, RISC-based design, 32-bit instruction and register set, K instruction cache, 8 KB zero-latency scratchpad memory, interrupt/trap/halt support, and C compiler readiness.

Scheduler 105 comprises circuitry configured to schedule and initiate packet processing that typically results in packet transmissions from integrated circuit 100, although scheduler 105 may also schedule and initiate other activities. Scheduler 105 schedules upcoming events, and as time passes, selects scheduled events for processing and reschedules unprocessed events. Scheduler 105 transfers processing requests for selected events to co-processor circuitry 107. Scheduler 105 can handle multiple independent schedules to provide prioritized scheduling across multiple traffic streams. To provide scheduling, scheduler 105 may execute a guaranteed cell rate algorithm to implement a leaky bucket or a token bucket scheduling system. The guaranteed cell rate algorithm is implemented through a cache that holds algorithm parameters. Scheduler 105 is described in detail in the above referenced co-pending patent applications.

Co-processor circuitry 107 receives communication packets from receive interface 106 and memory interface 109 and stores the packets in internal data buffers. Co-processor circuitry 107 correlates each packet to context information describing how the packet should be handled. Co-processor circuitry 107 stores the correlated context information in internal context buffers and associates individual data buffers with individual context buffers to maintain the correlation between individual packets and context information. Importantly, co-processor circuitry 107 ensures that only one copy of the correlated context information is present in the context buffers to maintain coherency. Multiple data buffers are associated with a single context buffer to maintain the correlation between the multiple packets and the single copy the context information.

Co-processor circuitry 107 also determines a prioritized processing order for core processor 104. The prioritized processing order controls the sequence in which core processor 104 handles the communication packets. The prioritized processing order is typically based on the availability of all of the resources and information that are required by core processor 104 to process a given communication packet. Resource state bits are set when resources become available, so co-processor circuitry 107 may determine when all of these resources are available by processing the resource state bits. If desired, the prioritized processing order may be based on information in packet handling requests. Co-processor circuitry 107 selects scheduling algorithms based on an internal scheduling state bits and uses the selected scheduling algorithms to determine the prioritized processing order. The algorithms could be round robin, service-to-completion, weighted fair queuing, simple fairness, first-come first-serve, allocation through priority promotion, software override, or some other arbitration scheme. Thus, the prioritization technique used by co-processor circuitry 107 is externally controllable. Co-processor circuitry 107 is described in more detail with respect to FIGS. 2–4.

Memory interface 109 comprises circuitry configured to exchange packets with external buffers in memory 103. Memory interface 109 maintains a pointer cache that holds pointers to the external buffers. Memory interface 109 allocates the external buffers when entities, such as core processor 104 or co-processor circuitry 107, read pointers from the pointer cache. Memory interface 109 de-allocates the external buffers when the entities write the pointers to the pointer cache. Advantageously, external buffer allocation and de-allocation is available through an on-chip cache read/write. Memory interface 109 also manages various external buffer classes, and handles conditions such as external buffer exhaustion. Memory interface 109 is described in detail in the above referenced patent applications.

In operation, receive interface 106 receives new packets from communication system 101, and scheduler 105 initiates transmissions of previously received packets that are typically stored in memory 103. To initiate packet handling, receive interface 106 and scheduler 105 transfer requests to co-processor circuitry 107. Under software control, core processor 104 may also request packet handling from co-processor circuitry 107. Co-processor circuitry 107 fields the requests, correlates the packets with their respective context information, and creates a prioritized work queue for core processor 104. Core processor 104 processes the packets and context information in order from the prioritized work queue. Advantageously, co-processor circuitry 107 operates in parallel with core processor 104 to offload the context correlation and prioritization tasks to conserve important core processing capacity.

In response to packet handling, core processor 104 typically initiates packet transfers to either memory 103 or communication system 102. If the packet is transferred to memory 103, then core processor 104 instructs scheduler 105 to schedule and initiate future packet transmission or processing. Advantageously, scheduler 105 operates in parallel with core processor 104 to offload scheduling tasks and conserve important core processing capacity.

In response to packet handling, core processor 104 typically initiates packet transfers to either memory 103 or communication system 102. If the packet is transferred to memory 103, then core processor 104 instructs scheduler 105 to schedule and initiate future packet transmission or processing. Advantageously, scheduler 105 operates in parallel with core processor 104 to offload scheduling tasks and conserve important core processing capacity.

Various data paths are used in response to core processor 104 packet transfer instructions. Co-processor circuitry 107 transfers packets directly to communication system 102 through transmit interface 108. Co-processor circuitry 107 transfers packets to memory 103 through memory interface 109 with an on-chip pointer cache. Memory interface 109 transfers packets from memory 103 to communication system 102 through transmit interface 108. Co-processor circuitry 107 transfers context information from a context buffer through memory interface 109 to memory 103 if there are no packets in the data buffers that are correlated with the context information in the context buffer. Advantageously, memory interface 109 operates in parallel with core processor 104 to offload external memory management tasks and conserve important core processing capacity.

Figure 2:
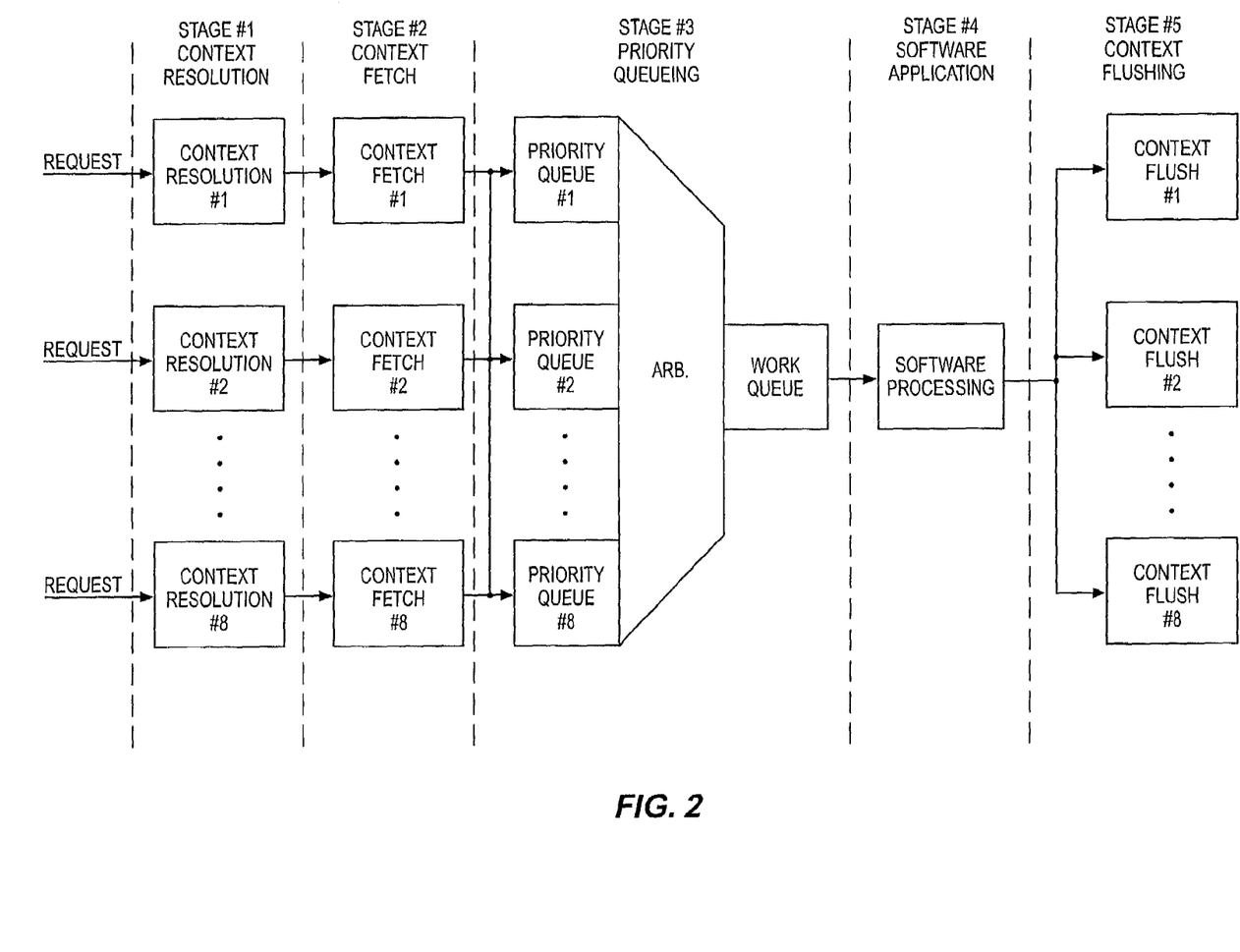
FIG. 2 is a block diagram that illustrates packet processing stages and the pipe-lining used by the circuit in an example of the invention.
Figure 3:
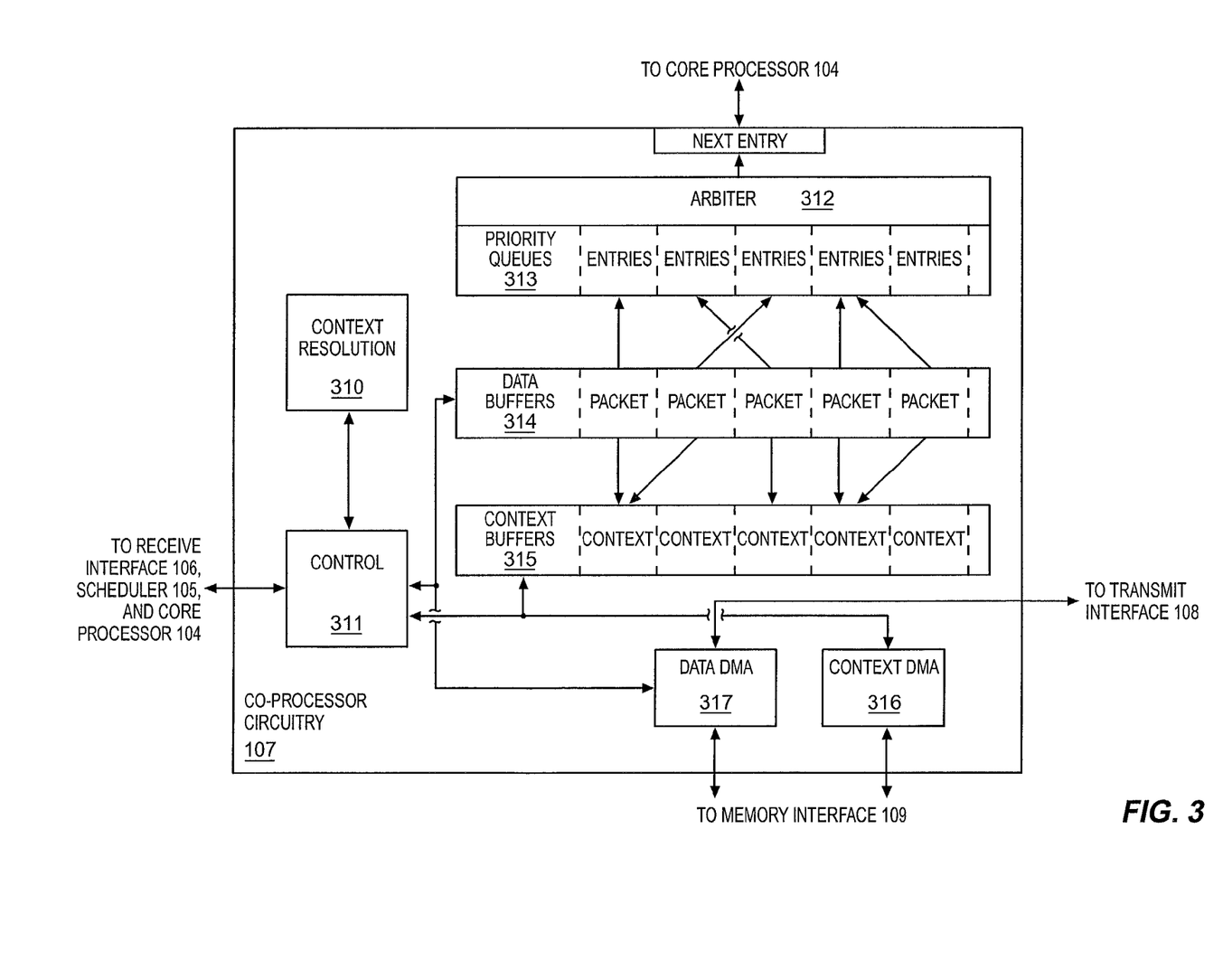
FIG. 3 is a diagram illustrating circuitry in the co-processing relating to context and data buffer processing in an example of the invention.
Figure 4:
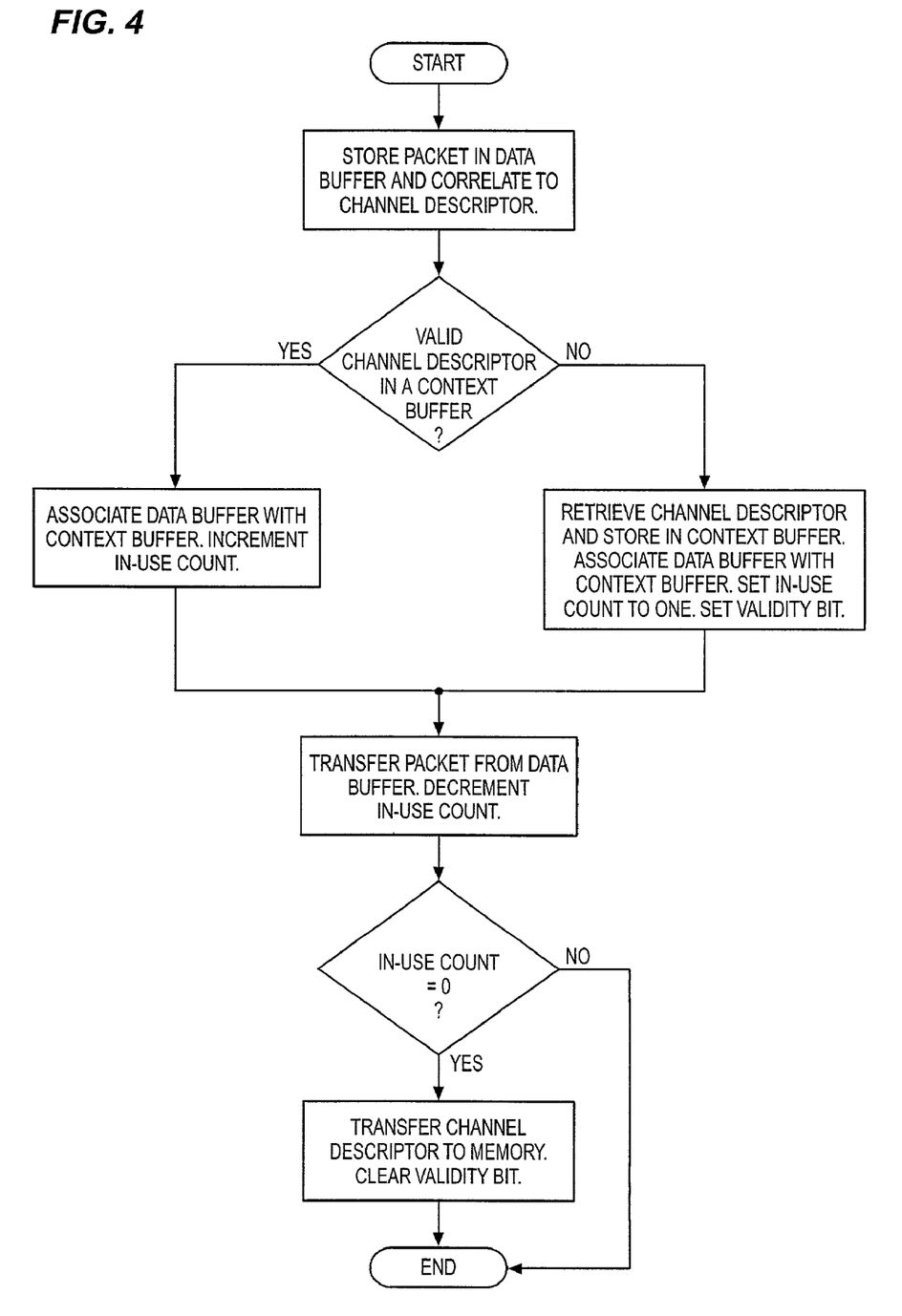
FIG. 4 is a block program flow diagram illustrating buffer correlation and in-use counts in an example of the invention.

Co-processor Circuitry—FIGS. 2–4:

FIGS. 2–4 depict one example of co-processor circuitry. Those skilled in the art will understand that FIGS. 2–4 have been simplified for clarity.

FIG. 2 illustrates how co-processor circuitry 107 provides pipelined operation in an example of the invention. FIG. 2 is vertically separated by dashed lines that indicate five packet processing stages: 1) context resolution, 2) context fetching, 3) priority queuing, 4) software application, and 5) context flushing. Co-processor circuitry 107 handles stages 1–3 to provide hardware acceleration. Core processor 104 handles stage 4 to provide software control with optimized efficiency due to stages 1–3. Co-processor circuitry 107 also handles stage 5. Co-processor circuitry 107 has eight pipelines through stages 1–3 and 5 to concurrently process multiple packet streams.

In stage 1, requests to handle packets are resolved to a context for each packet in the internal data buffers. The requests are generated by receive interface 106, scheduler 105, and core processor 104 in response to incoming packets, scheduled transmissions, and application software instructions. The context information includes a channel descriptor that has information regarding how the packet is to be handled. For example, a channel descriptor may indicate service address information, traffic management parameters, channel status, stream queue information, and thread status. In the current implementation, there are a maximum of 64,000 channels. Thus, 64,000 channels with different characteristics are available to support a wide array of service differentiation. Channel descriptors are identified by channel identifiers. Channel identifiers may be indicated by the request. A map may be used to translate selected bits from the packet header to a channel identifier. A hardware engine may also perform a sophisticated search for the channel identifier based on various information. Different algorithms that calculate the channel identifier from the various information may be selected by setting correlation state bits in co-processor circuitry 107. Thus, the technique used for context resolution is externally controllable.

In stage 2, context information is fetched, if necessary, by using the channel identifiers to transfer the channel descriptors to internal context buffers. Prior to the transfer, the context buffers are first checked for a matching channel identifier and validity bit. If a match is found, then the context buffer with the existing channel descriptor is associated with the corresponding internal data buffer holding the packet.

In stage 3, requests with available context are prioritized and arbitrated for core processor 104 handling. The priority may be indicated by the request—and it may be the source of the request. The priority queues 1–12 are 8 entries deep. Priority queues 1–12 are also ranked in a priority order by queue number. The priority for each request is determined, and when the context and data buffers for the request are valid, an entry for the request is placed in one of the priority queues that corresponds to the determined priority. The entries in the priority queues point to a pending request state RAM that contains state information for each data buffer. The state information includes a data buffer pointer, a context pointer, context validity bit, requester indicator, port status, a channel descriptor loaded indicator. This state information was referred to earlier in this document as the special state information associated with an event. These two terms may be used interchangeably.

The work queue indicates the selected priority queue entry that core processor 104 should handle next. To get to the work queue, the requests in priority queues are arbitrated using one of various algorithms such as round robin, service-to-completion, weighted fair queuing, simple fairness, first-come first-serve, allocation through priority promotion, and software override. The algorithms may be selected through scheduling state bits in co-processor circuitry 107. Thus, the technique used for prioritization is externally controllable. Co-processor circuitry 107 loads core processor 104 registers with the channel descriptor information for the next entry in the work queue.

In stage 4, core processor 104 executes the software application to process the next entry in the work queue which points to a portion of the pending state request RAM that identifies the data buffer and context buffer. The context buffer indicates one or more service addresses that direct the core processor 104 to the proper functions within the software application. One such function of the software application is traffic shaping to conform to service level agreements. Other functions include header manipulation and translation, queuing algorithms, statistical accounting, buffer management, inter-working, header encapsulation or stripping, cyclic redundancy checking, segmentation and reassembly, frame relay formatting, multicasting, and routing. Any context information changes made by the core processor 104 are linked back to the context buffer in real time.

In stage 5, context is flushed. Typically, core processor 104 instructs coprocessor circuitry 107 to transfer packets to off-chip memory 103 or transmit interface 108. If no other data buffers are currently associated with the pertinent context information, then co-processor circuitry 107 transfers the context information to off-chip memory 103.

FIG. 3 is a block diagram that illustrates co-processor circuitry 107 in an example of the invention. Co-processor circuitry 107 comprises a hardware engine that is firmware-programmable in that it operates in response to state bits and register content. In contrast, core processor 104 is a microprocessor that executes application software. Co-processor circuitry 107 operates in parallel with core processor 104 to conserve core processor capacity by off-loading numerous tasks from the core processor 104.

Co-processor circuitry 107 comprises context resolution 310, control 311, arbiter 312, priority queues 313, data buffers 314, context buffers 315, context DMA 316, and data DMA 317. Data buffers 314 hold packets and context buffers 315 hold context information, such as a channel descriptor. Data buffers 314 are relatively small and of a fixed size, such as 64 bytes, so if the packets are ATM cells, each data buffer holds only a single ATM cell and ATM cells do not cross data buffer boundaries.

Individual data buffers 314 are associated with individual context buffers 315 as indicated by the downward arrows. Priority queues 313 hold entries that represent individual data buffers 314 as indicated by the upward arrows. Thus, a packet in one of the data buffers is associated with its context information in an associated one of the context buffers 315 and with an entry in priority queues 313. Arbiter 312 presents a next entry from priority queues 313 to core processor 104 which handles the associated packet in the order determined by arbiter 312.

Context DMA 316 exchanges context information between memory 103 and context buffers 315 through memory interface 109. Context DMA automatically updates queue pointers in the context information. Data DMA 317 exchanges packets between data buffers 314 and memory 103 through memory interface 109. Data DMA 317 also transfers packets from memory 103 to transmit interface 108 through memory interface 109. Data DMA 317 signals context DMA 316 when transferring packets off-chip, and context DMA 316 determines if the associated context should be transferred to off-chip memory 103. Both DMAs 316–317 may be configured to perform CRC calculations.

For a new packet from communication system 101, control 311 receives the new packet and a request to handle the new packet from receive interface 106. Control 311 receives and places the packet in one of the data buffers 314 and transfers the packet header to context resolution 310. Based on gap state bits, a gap in the packet may be created between the header and the payload in the data buffer, so core processor 104 can subsequently write encapsulation information to the gap without having to create the gap. Context resolution 310 processes the packet header to correlate the packet with a channel descriptor, although in some cases, receive interface 106 may have already performed this context resolution. The channel descriptor comprises information regarding packet transfer over a channel.

Control 311 determines if the channel descriptor that has been correlated with the packet is already in one of the context buffers 315 and is valid. If so, control 311 does not request the channel descriptor from off-chip memory 103. Instead, control 311 associates the particular data buffer 314 holding the new packet with the particular context buffer 315 that already holds the correlated channel descriptor. This prevents multiple copies of the channel descriptor from existing in context buffers 314. Control 311 then increments an in-use count for the channel descriptor to track the number of data buffers 314 that are associated with the same channel descriptor.

If the correlated channel descriptor is not in context buffers 315, then control 311 requests the channel descriptor from context DMA 316. Context DMA 316 transfers the requested channel descriptor from off-chip memory 103 to one of the context buffers 315 using the channel descriptor identifier, which may be an address, that was determined during context resolution. Control 311 associates the context buffer 315 holding the transferred channel descriptor with the data buffer 314 holding the new packet to maintain the correlation between the new packet and the channel descriptor. Control 311 also sets the in-use counter for the transferred channel descriptor to one and sets the validity bit to indicate context information validity.

Control 311 also determines a priority for the new packet. The priority may be determined by the source of the new packet, header information, or channel descriptor. Control 311 places an entry in one of priority queues 313 based on the priority. The entry indicates the data buffer 314 that has the new packet. Arbiter 312 implements an arbitration scheme to select the next entry for core processor 104. Core processor 104 reads the next entry and processes the associated packet and channel descriptor in the particular data buffer 314 and context buffer 315 indicated in the next entry.

Each priority queue has a service-to-completion bit and a sleep bit. When the service-to-completion bit is set, the priority queue has a higher priority that any priority queues without the service-to-completion bit set. When the sleep bit is set, the priority queues is not processed until the sleep bit is cleared. The ranking of the priority queue number breaks priority ties. Each priority queue has a weight from 0–15 to ensure a certain percentage of core processor handling. After an entry from a priority queue is handled, its weight is decremented by one if the service-to-completion bit is not set The weights are re-initialized to a default value after 128 requests have been handled or if all weights are zero. Each priority queue has a high and low watermark. When outstanding requests that are entered in a priority queue exceed its high watermark, the service-to-completion bit is set. When the outstanding requests fall to the low watermark, the service-to-completion bit is cleared. The high watermark is typically set at the number of data buffers allocated to the priority queue.

Figure 6:
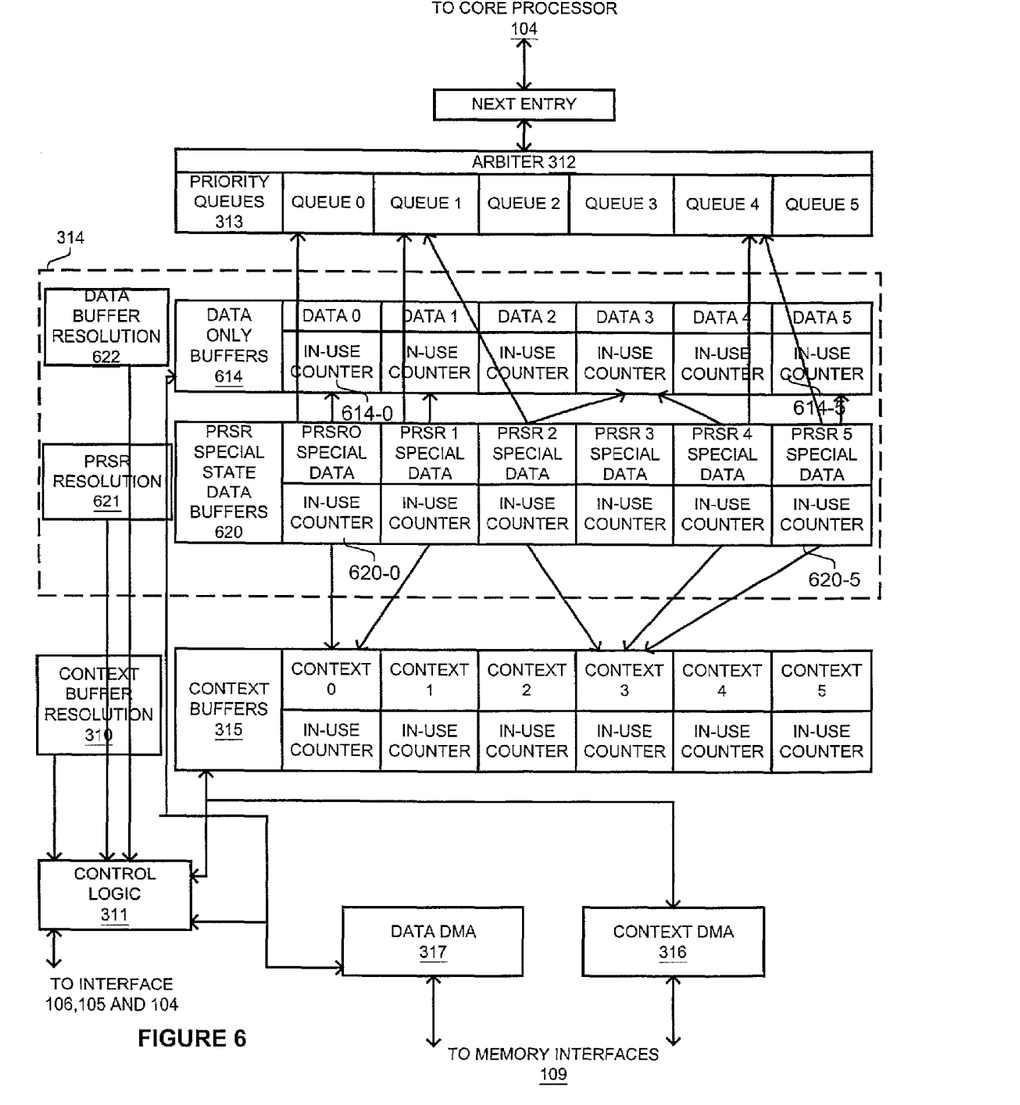
FIG. 6 is a block diagram showing the details of the data and special state information buffers in an example of the invention.

The context buffers 315 each have an associated in-use counter. The in-use counters associated with the context buffers is not shown in FIG. 3, but it is shown in FIG. 6.

Core processor 104 may instruct control 311 to transfer the packet to off-chip memory 103 through data DMA 317. Control 311 decrements the context buffer in-use counter, and if the in-use counter is zero (no data buffers 314 are associated with the context buffer 315 holding the channel descriptor), then control 311 instructs context DMA 316 to transfer the channel descriptor to off-chip memory 103. Control 311 also clears the validity bit. This same general procedure is followed when scheduler 105 requests packet transmission, except that in response to the request from scheduler 105, control 311 instructs data DMA 317 to transfer the packet from memory 103 to one of data buffers 314.

The present invention provides additional circuitry associated with data buffers 314. The additional circuitry provided by the present invention is shown in FIG. 6 and it will be explained in detail later.

FIG. 4 is a flow diagram that illustrates the operation of coprocessor circuitry 107 when correlating buffers in an example of the invention. Co-processor circuitry 107 has eight pipelines to concurrently process multiple packet streams in accord with FIG. 3.

First, a packet is stored in a data buffer, and the packet is correlated to a channel descriptor as identified by a channel identifier. The channel descriptor comprises the context information regarding how packets in the different channels are to be handled.

Next, context buffers 314 are checked for a valid version of the correlated channel descriptor. This entails matching the correlated channel identifier with a channel identifier in a context buffer that is valid. If the correlated channel descriptor is not in a context buffer that is valid, then the channel descriptor is retrieved from memory 103 and stored in a context buffer using the channel identifier. The data buffer holding the packet is associated with the context buffer holding the transferred channel descriptor. An in-use counter for the context buffer holding the channel descriptor is set to one. A validity bit for the context buffer is set to indicate that the channel descriptor in the context buffer is valid. If the correlated channel descriptor is already in a context buffer that is valid, then the data buffer holding the packet is associated with the context buffer already holding the channel descriptor. The in-use counter for the context buffer holding the channel descriptor is incremented.

Figure 9A:
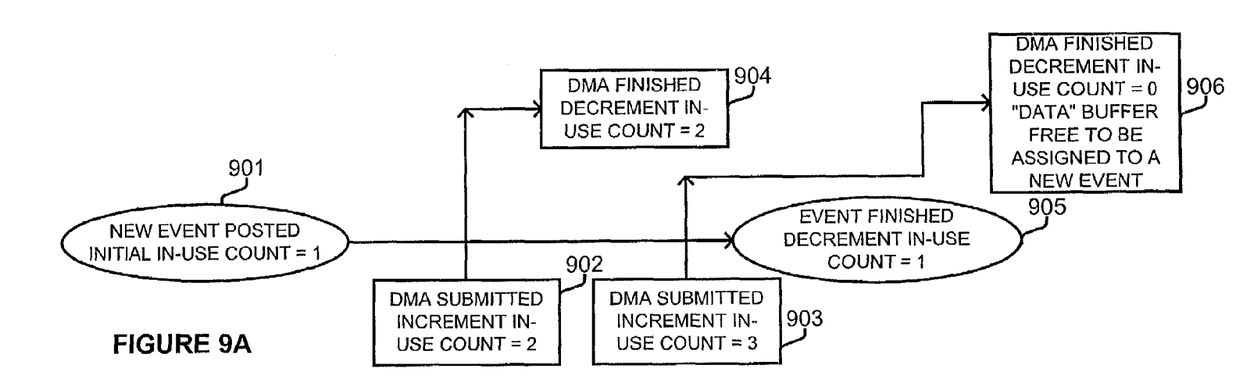
FIGS. 9A and 9B are block program flow diagram illustrating examples of how DMA commands are handled in an example of the invention.
Figure 9B:
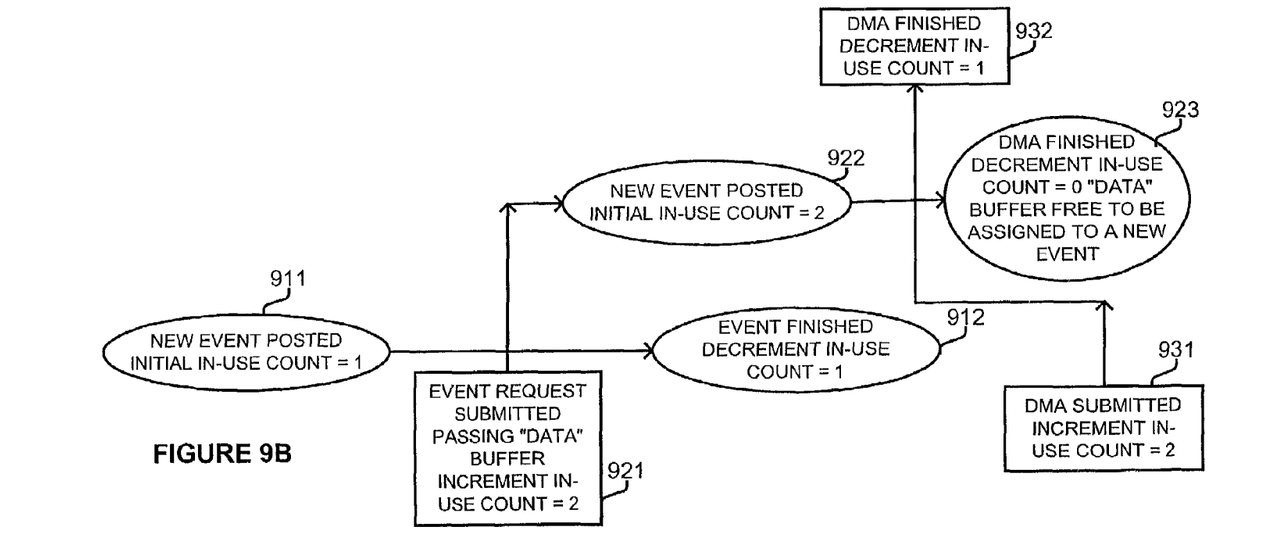

Typically, core processor 104 instructs co-processor circuitry 107 to transfer packets to off-chip memory 103 or transmit interface 108. Data DMA 317 transfers the packet and signals context DMA 316 when finished. Context DMA 316 decrements the in-use counter for the context buffer holding the channel descriptor, and if the decremented in-use count equals zero, then context DMA 316 transfers the channel descriptor to memory 103 and clears the validity bit for the context buffer. The effect of DMA operations on the in-use counts of the special state buffers and the data buffers will be explained later. FIGS. 9A and 9B will be used to illustrate these operations.

Figure 5:
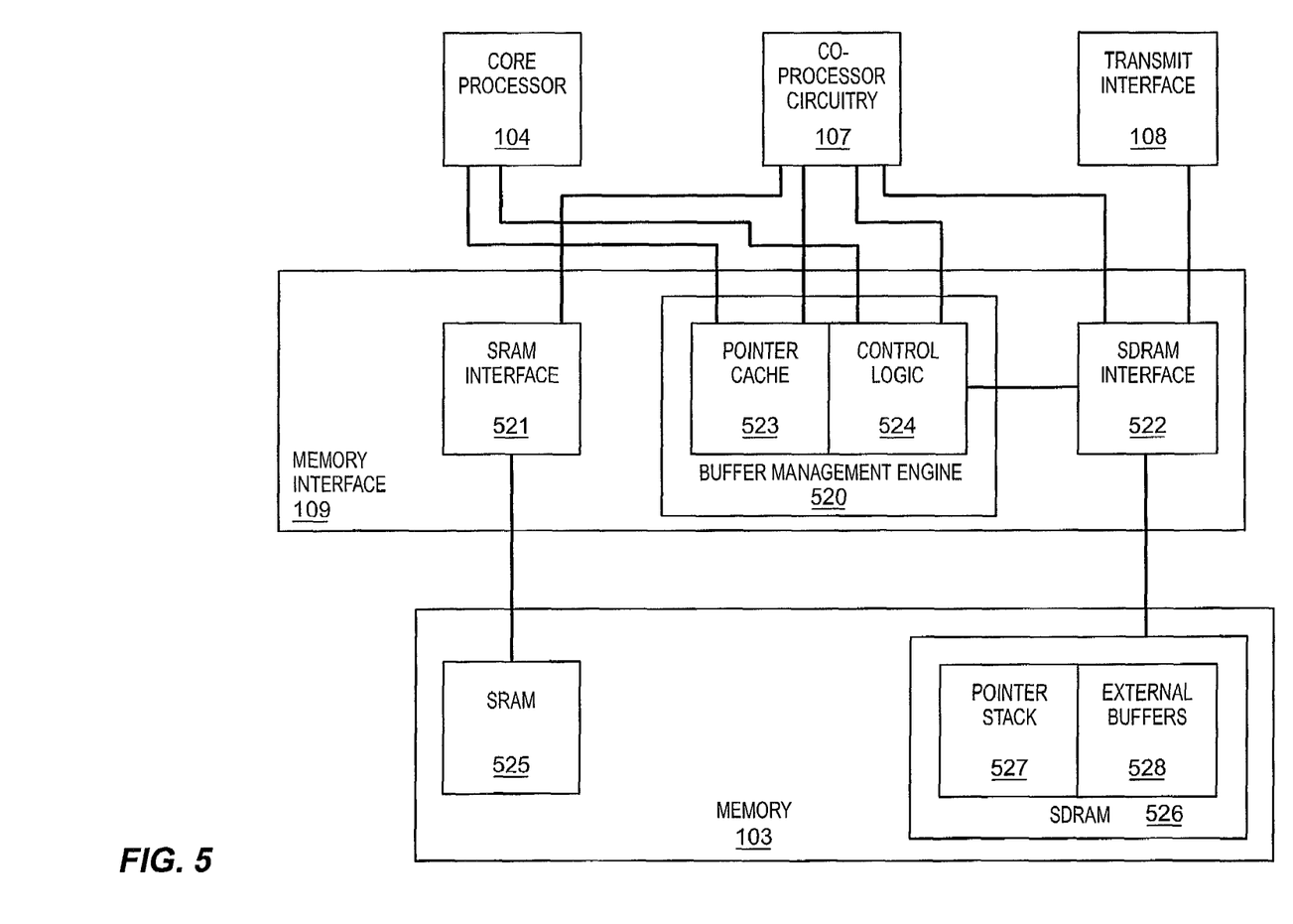
FIG. 5 is a block diagram of the buffer management circuitry in an example of the invention.

Memory Interface 109—FIG. 5

FIG. 5 depicts a specific example of memory interface circuitry in accord with the present invention. Those skilled in the art will appreciate numerous variations from the circuitry shown in this example may be made. Furthermore, those skilled in the art will appreciate that some conventional aspects of FIGS. 5–6 have been simplified or omitted for clarity.

FIG. 5 is a block diagram that illustrates memory interface 109. Memory interface 109 comprises a hardware circuitry engine that is firmware-programmable in that it operates in response to state bits and register content. In contrast, core processor 104 is a micro-processor that executes application software. Memory interface 109 operates in parallel with core processor 104 to conserve core processor capacity by off-loading numerous tasks from the core processor.

Both FIG. 1 and FIG. 5 show memory 103, core processor 104, co-processor circuitry 107, transmit interface 108, and memory interface 109. Memory 103 comprises Static RAM (SRAM) 525 and Synchronous Dynamic RAM (SDRAM) 526, although other memory systems could also be used. SDRAM 526 comprises pointer stack 527 and external buffers 528. Memory interface 109 comprises buffer management engine 520, SRAM interface 521, and SDRAM interface 522. Buffer management engine 520 comprises pointer cache 523 and control logic 524.

Conventional components could be used for SRAM interface 521, SDRAM interface 522, SRAM 525, and SDRAM 526. SRAM interface 521 exchanges context information between SRAM 525 and co-processor circuitry 107. External buffers 528 use a linked list mechanism to store communication packets externally to integrated circuit 100.

Pointer stack 527 is a cache of pointers to free external buffers 528 that is initially built by core processor 104. Pointer cache 523 stores pointers that were transferred from pointer stack 527 and correspond to external buffers 528. Sets of pointers may be periodically exchanged between pointer stack 527 and pointer cache 523. Typically, the exchange from stack 527 to cache 523 operates on a first-in/first-out basis.

In operation, core processor 104 writes pointers to free external buffers 528 to pointer stack 527 in SDRAM 526. Through SDRAM interface 522, control logic 524 transfers a subset of these pointers to pointer cache 523. When an entity, such as core processor 104, co-processor circuitry 107, or an external system, needs to store a packet in memory 103, the entity reads a pointer from pointer cache 523 and uses the pointer to transfer the packet to external buffers 528 through SDRAM interface 522. Control logic 524 allocates the external buffer as the corresponding pointer is read from pointer cache 523. SDRAM stores the packet in the external buffer indicated by the pointer. Allocation means to reserve the buffer, so other entities do not improperly write to it while it is allocated.

When the entity no longer needs the external buffer—for example, the packet is transferred from memory 103 through SDRAM interface 522 to co-processor circuitry 107 or transmit interface 108, then the entity writes the pointer to pointer cache 523. Control logic 524 de-allocates the external buffer as the corresponding pointer is written to pointer cache 523. De-allocation means to release the buffer, so other entities may reserve it. The allocation and de-allocation process is repeated for other external buffers 528.

Control logic 524 tracks the number of the pointers in pointer cache 523 that point to de-allocated external buffers 528. If the number reaches a minimum threshold, then control logic 524 transfers additional pointers from pointer stack 527 to pointer cache 523. Control logic 524 may also transfer an exhaustion signal to core processor 104 in this situation. If the number reaches a maximum threshold, then control logic 524 transfers an excess portion of the pointers from pointer cache 523 to pointer stack 527.

FIG. 6 shows the detailed logic added to the data buffer 314 shown in FIG. 3 in an example of the invention. The data buffer 314 includes two sections designated data only buffers 614 and special state information buffers 620. For this embodiment, there are six buffers for data only and six buffers for special state information, shown in the diagram. For other embodiments, there are numerous data buffers and special state information buffers. The data buffers are assigned an index number from zero to the maximum number of data buffers in the co-processor 107. The special state information buffers are also assigned an index from zero to the maximum number of special state information buffers in the co-processor 107. Furthermore, the context buffers are also assigned an index from zero to the maximum number of context buffers in the co-processor 107. These indexes are used by the logic in the co-processor 107 and the core processor 104 to identify an individual context buffer, data buffer, or special state information buffer. In one embodiment, there are sixteen of each of these type of buffers in the co-processor 107. The exact number of each of these buffers is not significant to the general operation of the logic.

Each buffer has an associated in-use counter 614-0 to 614-5 and 620-0 to 620-5. The in-use counters keep track of the number of events, which are using the data in the particular buffers. Each in-use counter is incremented by one for each event, which is using the data or state information in a particular buffer. When an event finishes with a particular buffer, the in-use counter is decremented by one. When the count in an in-use counter reaches zero, no events are using the particular buffer and it can be reallocated. Data buffer resolution logic 622 and PRSR special data resolution logic 621 operates similar to the operation of context buffer resolution 310, which was previously described.

Data buffer resolution logic 622 keeps track of which data buffers 614 are in use and which are available to the assigned to new events. Data buffer resolution logic 622 also contains the logic for incrementing and decrementing the in use counters associated with the data buffers 614. PRSR special data resolution logic 621 keeps track of which special state information buffers are in use and which are available to be assigned to new events. PRSR special data resolution logic 621 also contains the logic for incrementing and decrementing the in use counters associated with the special state information buffers.

PRSR special data resolution logic 621 and data buffer resolution logic 622 select a buffer to be assigned to a new event by scanning the in use counts of all their associated buffers and picking the buffer with the lowest index which has an in-use count of zero. In other embodiments, there are numerous variations in selecting a buffer to be assigned to a new event and which has an in-use count of zero. Some examples of selecting a buffer are first-in-first-out selection and last-in-first-out selection.

Context resolution 310 contains the logic used to select the context buffer to be assigned to a new event. A global configuration bit is used to pick which of two mechanisms is used to select the next context buffer to be assigned to a new event. One mechanism picks the context buffer in the same manner as the next data buffer is picked. As previous described, this method returns the context buffer with a zero in-use count which has the lowest index. The problem with this selection mechanism for context buffers is that the selection mechanism tends to select the context buffer that have been most recently freed. For instance, when context buffer with index zero is freed, it is always the next new index to be selected. Because context information, which is not already stored in a context buffer, needs to be read in from off-chip memory, under certain conditions is better to not reuse a context buffer as soon as its in-use count goes to zero.

This problem is addressed by the second context selection mechanism. This mechanism uses a moving "finger" which determines at what index the logic will start searching for an in-use count of zero. The value of the finger is incremented after each new context selection. Hence, for the first context new selection the logic will start search forward from index zero. For the second new context select, the logic will start searching forward from index 1, etc.

As is shown by the arrows in FIG. 6, the special state information data buffer 620 contains a pointer to an associated data buffer 614 as well as an associated context buffer 315 (hereinafter these will also be referred to as resources). Because of these links, a special state data buffer can be used to identify the resources associated with an event. As shown by the arrows from the special state data buffers to the priority queues 313, a special state data buffer pointer is stored in the appropriate priority queue. This logic was described in more detail above in stage 3 of FIG. 3. When the arbiter 312 picks the next entry to service from the priority queue, the arbiter 312 returns a special state data buffer pointer. This pointer is then used by logic associated with the core processor 104 and the co-processor circuitry 107 to identify the context and data buffer resources the event will be using.

In one embodiment, the size of a data buffer 614 is 64-bytes, the size of a context buffer 315 is 64-bytes, and the size of a special state data buffer 620 is 44 bits. As recognized by those skilled in the art, the size of these buffers could be changed without affecting the operation of the logic in FIG. 6.

Figure 7:
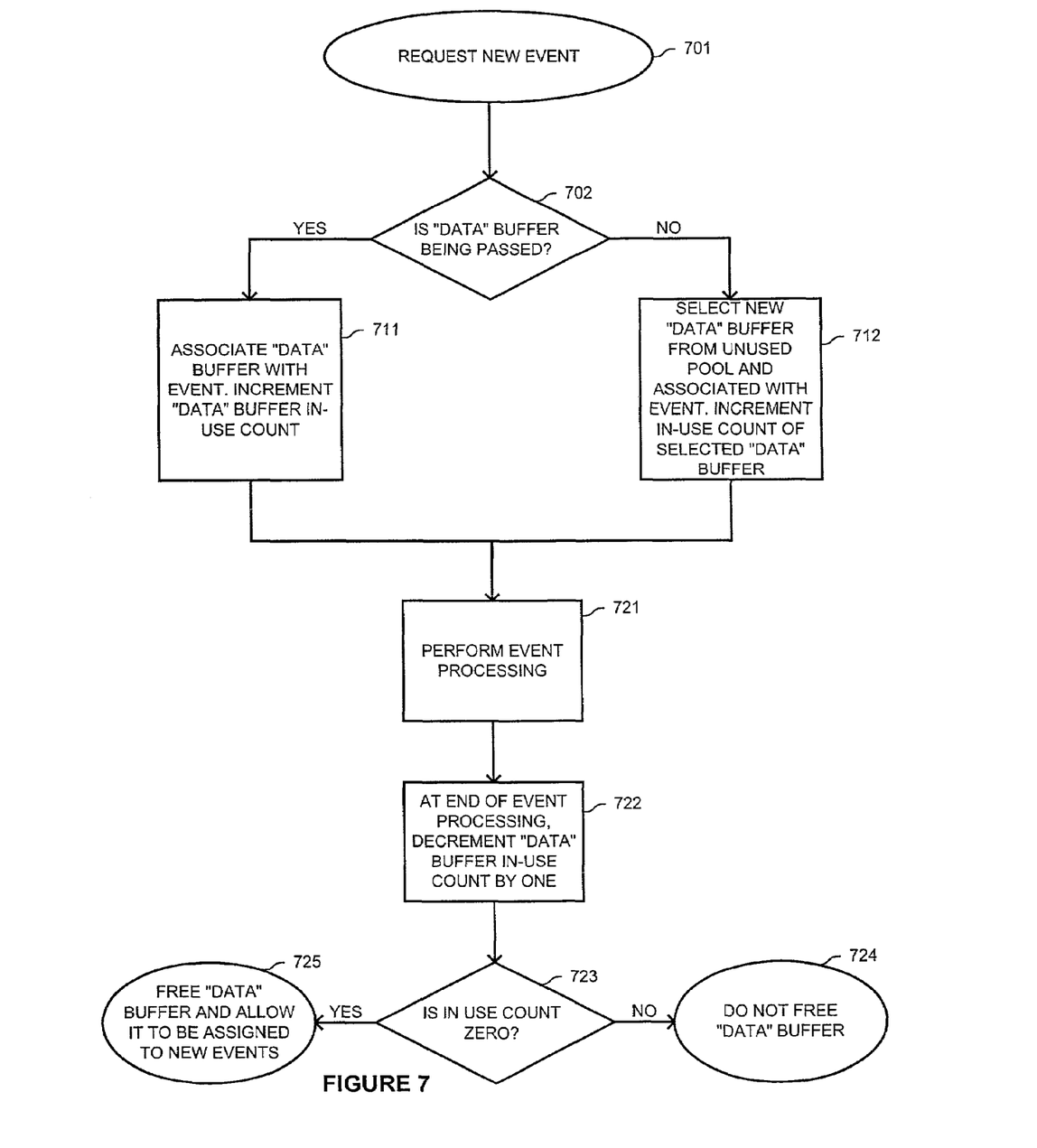
FIG. 7 is a block program flow diagram illustrating how data buffers are passed between events in an example of the invention.

FIG. 7 is a block flow diagram showing how a data buffer 614 can be passed from one event to another event in an example of the invention. When a new event begins as indicated by steps 701 and 702, a check is made to determine if the particular event is using a passed data buffer. If the particular event would like to use a "passed" data buffer, the particular data buffer 614 is associated with the event and the in-use counter for the particular data. Next as indicated by step 721, the event processing takes place and at the end of the event, the in-use counter of the data buffer is decremented by one in step 722. Next as indicated by step 723, a check is made to determine if the in-use counter is zero. If the count is zero, the buffer is freed and can be assigned to a new event as indicated by step 725. If the count is not zero, as indicated by step 724, the buffer is not freed since the buffer is still in use by some other event.

Figure 8:
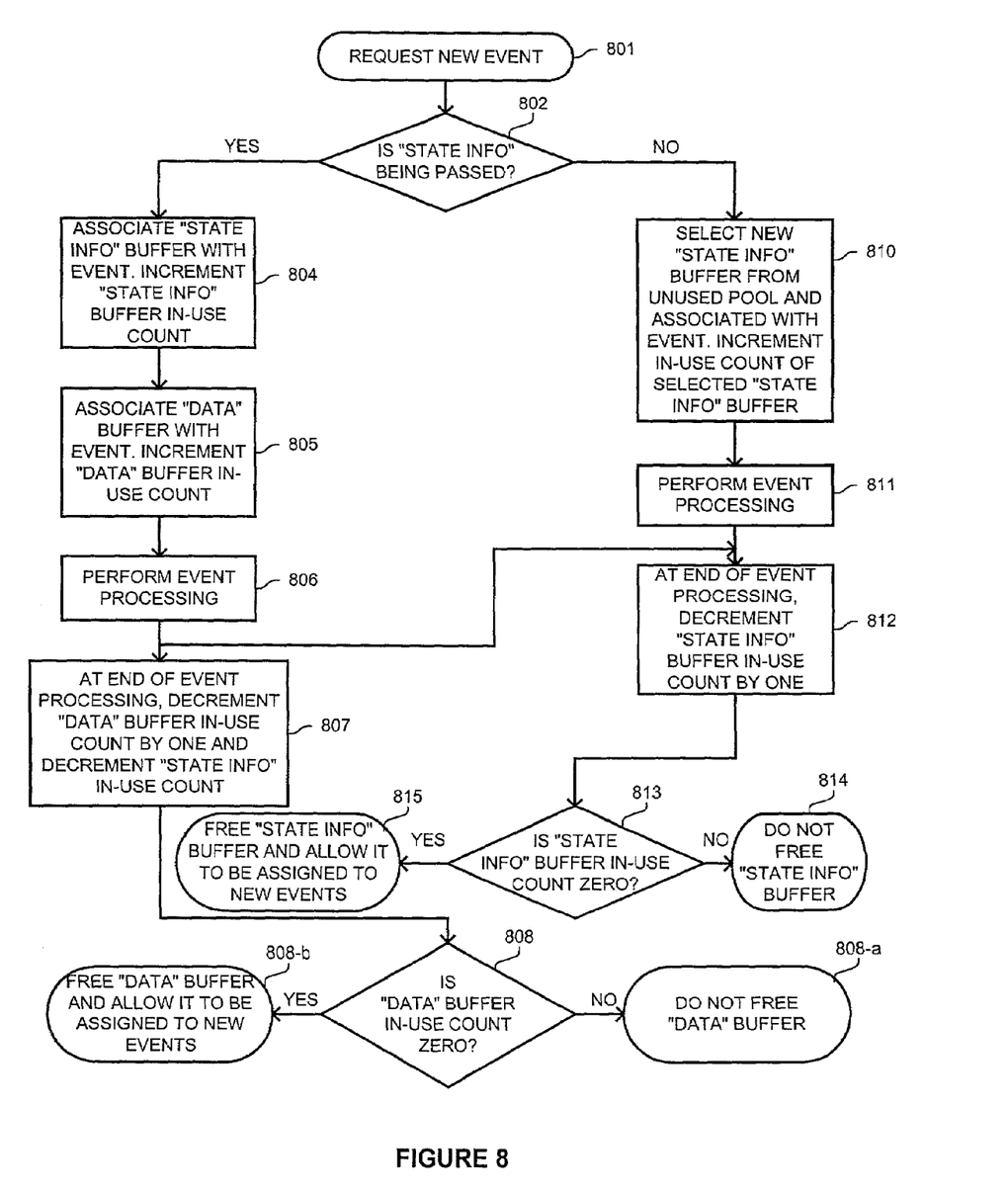
FIG. 8 is a block program flow diagram illustrating how state information buffers are passed between events in an example of the invention.

FIG. 8 is a block flow diagram showing how state information is passed between events in an example of the invention. As indicated by step 802, a determination is made is as to whether or not an event is passing "state" information. If state information is not being passed, the operation proceeds as indicated by steps 810 to 815. A new state information buffer is selected from the unused pool of buffers as indicated by step 810. Next as indicated by step 811 the event is performed. At the end of the event, the in-use counter is decremented by one (step 812) and a check is made to determine if the count is zero at step 813. If the count is zero, the buffer is free to be assigned as indicated by step 815. Otherwise, the buffer is not freed as indicated by block 814.

The operations that occur when "state" information is passed from one event to another event are indicated by steps 804 to 808. When "state" information is passed from one event to another event, the information in the data only buffer 614 is also passed between the events. This is indicated by steps 804 and 805. The event proceeds as indicated by step 806, and at the end of the event, as indicated by steps 807 and 812, the in-use counter of the data only buffer 614 and the state information buffer 620 is decreased by one. As indicated by steps 808, 808-a and 808-b and 813 to 815 the check is then made to determine if the in-use counter has reached zero to determine if the buffers can be re-assigned.

An event can pass data or special state information associated with one event to a new event, which does not share the same context information. Such transfers are possible because the state information is stored in a buffer that is separate from the data buffer. An event can also pass a multi-bit message from a current event to a subsequent event that is generated by the current event. This message is stored in the special state buffer of the subsequent event.

FIGS. 9A and 9B illustrate examples of how one embodiment of the invention operates. The horizontal dimension in FIGS. 9A and 9B represents time. FIG. 9A illustrates how the in-use counts for a data buffer change for an event which submits a DMA command in an example of the invention. The process begins at step 901. It is assumed that at this point the in-use count of the data buffer is one. While the event posted as indicated by step 901 is progressing, steps 902 and 903 indicate that two DMA transfers are submitted. The data buffer count is incremented to two by the first DMA command and to three by the second DMA command. As indicated by step 904, when the first DMA transfer finishes, the in-use count is reduced to two. When the event posted as indicated by block 901 is complete, the in-use count is reduced to one as indicated by block 905. Finally, when the second DMA transfer is complete, the in-use count is reduced to zero as indicated by step 906. Conventional logic is provided in co-processor circuitry 107 to handle the changes to the in-use counts as described.

FIG. 9B indicates how the in-use count of a data buffer changes for an event, which creates a shared data buffer in an example of the invention. As in FIG. 9A, the horizontal dimension indicates time. The illustrated process begins as indicated by step 911 with an event being posted. In one embodiment, this event requested a new data buffer. This data buffer would have an initial in-use count of zero and when the event is posted, as indicated by step 911, the in-use count is increased to one. Step 921 represents another event request, which is posted as indicated by step 922. For the event request shown in 921, the first event passes its data buffer to the second event so the second event starts with a data buffer in-use count of two. This initial in-use count of two is arrived at using multiple steps. When the core processor 104 initiates a request for another event, the data buffer in-use count is immediately incremented by one in order to reserve this data buffer for the next event. In step 922, the event request is for another core processor event, the co-processor circuitry 107 receives this event request and passes this request to the section of the co-processor logic which handles core processor event requests. This is the same logic, which handled the initial event generation indicated in 901 or 911. When the event is processed by this section of the co-process logic, the in-use count of the data buffer is again incremented as this data buffer is assigned to the new event. When this new event is created, the section of the co-processor circuitry 107 that handles event requests, signals back to the section of the co-processor circuitry 107, which received this event request from the core processor 104. This section of the co-processor logic, now requests the in-use count of the data buffer be decremented by one. Hence, there is a total of two increments and one decrement and the new event is posted with an effective initial data buffer in-use count two.

The system is setup so that if step 922 is delayed by stalls in the system such that this event request is really processed after 912 happens, the data buffer is reserved using in-use counts by the 921 operation until the 922 operation can take place. This assures that independent of the relative timing of 922 and 912 this is not time between 912 and 922 that the value of the data buffer's in-use count allows this passed data buffer to be viewed as an unassigned data buffer. The effective reservation of this data buffer by incrementing the in-use count when the event request 921 is posted, assures that no intervening event request can mistakenly view this data buffer as unassigned and reallocate this data buffer Step 912 indicates that when the first event is finished, the data buffer count is reduced to one. Steps 931 and 932 indicate a DMA request that is submitted and posted using the same data buffer. As indicated by steps 932 and 931 the count is increased to two and then reduced to one when the DMA request is finished. Finally, as indicated by step 923, the event posed at step 922 is finished, the in-use count is reduced to zero and the data buffer can be re-assigned to a new event.

It should be noted that the descriptions for the examples give in FIGS. 9A and 9B explain only the change in the data buffer in-use count. The in-use counts of the context and special state information buffers change in a similar manner.

It should also be noted that the examples given in FIGS. 9A and 9B are meant to be illustrative examples only. Many other sequences can occur. The point of FIGS. 9A and 9B is to illustrate that with the present invention, there can be a composition of multiple processing tasks in situations where the subsequent tasks have no idea that any of their resources (data buffer/context buffer/special state buffer) had been processed by a previous service task. The in-use counters keep track of this automatically.

While the invention has been shown and described with respect to embodiments thereof, it will be appreciated by those skilled in the art that various changes in forma and detail can be made without departing from the spirit and scope of the invention. Applicant's invention is limited only by the scope of the appended claims.

We claim:

1. An integrated circuit for processing events related to communication packets, said integrated circuit comprising:
a core processor configured to execute software to process a series of communication packets, the processing of each packet being an event and having associated data and context information; and
a co-processor comprising a plurality of state information buffers for storing state information, a plurality of context buffers for storing context information associated with a plurality of events and a plurality of data buffers for storing data associated with the plurality of events where the state information comprises a data buffer pointer pointing to one of the plurality of data buffers and a context buffer pointer pointing to one of the plurality of context buffers, where the plurality of state information buffers, the plurality of context buffers and the plurality of data buffers are formed as special purpose dedicated hardware buffers in the integrated circuit;
the state information is associated with events wherein each of said state information buffers has an in-use counter indicating the number of events associated with the contents of said buffer.

2. The integrated circuit of claim 1 wherein said co-processor comprises an in-use counter associated with each of said context buffers.

3. The integrated circuit of claim 1 wherein said co-processor comprises an in-use counter associated with each of said data buffers.

4. The integrated circuit of claim 1 wherein said plurality of data buffers each having an in-use counter whereby data can be transferred from one event to another event by changing information in a data buffer.

5. An integrated circuit for processing events related to communication packets, said integrated circuit comprising:
a core processor configured to execute software to process a series of communication packets, the processing of each packet being an event and having associated data and context information; and
a co-processor comprising a plurality of state information buffers for storing state information associated with events wherein each of said state information buffers having an in-use counter indicating the number of events associated with the contents of said buffer, wherein said co-processor comprises a plurality of data only information buffers, a plurality of context information buffers, an in-use counter for each of said data only buffers and an in-use counter for each of said context buffers where data can be passed from one event to another event by changing the data in one of said state information buffers and where the state information comprises a data only buffer pointer pointing to one of the plurality of data only information buffers and a context information buffer pointer pointing to one of the pluralities of context information buffers and where the plurality of state information buffers, the plurality of context buffers and the plurality of data buffers are formed as special purpose dedicated hardware buffers in the integrated circuit.

6. A method of processing events related to communication packets in an integrated circuit which includes a core processor and a co-processor having a state information buffer for storing state information, a context buffer for storing context information and a data buffer for storing data where the state information comprises a data buffer pointer and a context pointer-where the data buffer pointer points to the data buffer and the context pointer points to the context buffer, the state information for an event is stored separate from the data associated with said event, said state information buffer, said context buffer, and said data buffer each having an associated in-use counter and where the state information buffer, the context buffer and the data buffer are formed as special purpose dedicated hardware buffers in the integrated circuit, the method comprising:
incrementing the in-use counter associated with said state information buffer when an event is associated with said state information buffer;
decrementing the in-use counter of said state information buffer when said event associated with said buffer is finished;
incrementing the in-use counter associated with said context buffer when an event is associated with said context buffer;
decrementing the in-use counter of said context buffer when said event associated with said context buffer is finished;
incrementing the in-use counter associated with said data buffer when an event is associated with said data buffer; and
decrementing the in-use counter of said data buffer when said event associated with said data buffer is finished.

7. An integrated circuit for processing events associated with communication packets which includes a core processor and a co-processor, the improvement which comprises, separate buffets for data, context, and state information and in-use counters for all of said buffers, whereby the contents of a data buffer can be passed from one event to another event, each of said events having state information in a separate state information buffer where the state information comprises a data buffer pointer pointing to a data buffer, and a context pointer pointing to a context buffer and where the separate state information buffer, the separate context buffer and the separate data buffer are formed as special purpose dedicated hardware buffers in the integrated circuit.

8. The integrated circuit of claim 7 which includes a plurality of data buffers, a plurality of state information buffers and a plurality of context information buffers, each of said plurality of data buffers and each of said plurality of state information buffers and each of said plurality of context buffers having an in-use counter which is incremented when an event is associated with one of the plurality of data buffers or with one of the plurality of state information buffers or with one of said plurality of context buffers and decremented when an event is finished utilizing one of the plurality of data buffers or with one of the plurality of state information buffers or with one of said plurality of context buffer.

* * * * *

UNITED STATES PATENT AND TRADEMARK OFFICE
CERTIFICATE OF CORRECTION

PATENT NO. : 7,099,328 B2 Page 1 of 1
APPLICATION NO. : 09/919283
DATED : August 29, 2006
INVENTOR(S) : Galbi et al.

It is certified that error appears in the above-identified patent and that said Letters Patent is hereby corrected as shown below:

Title Page; item (60);
In the Related U.S. Application Data on the Face of the Patent, reading "Continuation of application No. 09/640,258, filed on Aug. 16, 2000, now Pat. No. 6,754,223, which is a continuation of application No. 09/640,231" should read --Continuation of application No. 09/640,258, filed on Aug. 16, 2000, now Pat. No. 6,754,223, and a continuation of application No. 09/640,231--.

Signed and Sealed this

Eighth Day of April, 2008

JON W. DUDAS
*Director of the United States Patent and Trademark Office*